Feb. 26, 1924.
H. J. BLAKESLEE
MEANS FOR INDICATING LOAD CONDITIONS OF TRANSFORMERS
Filed Dec. 29, 1921
1,485,013
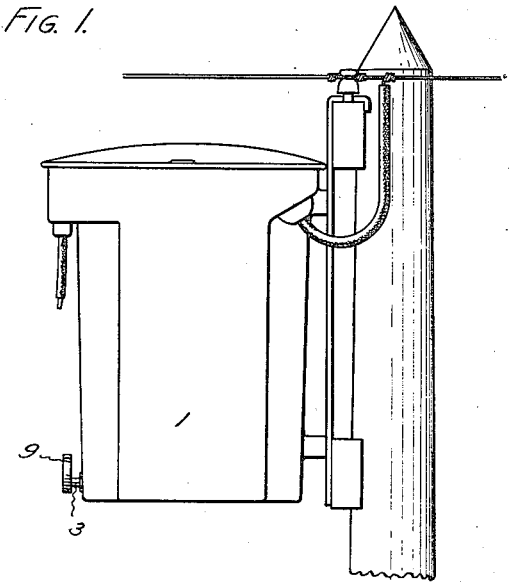
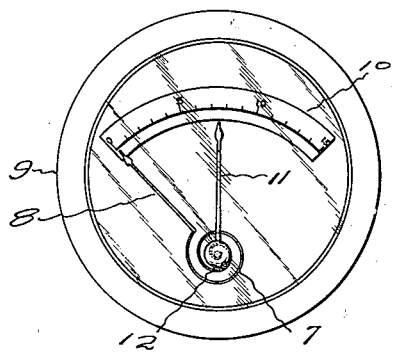
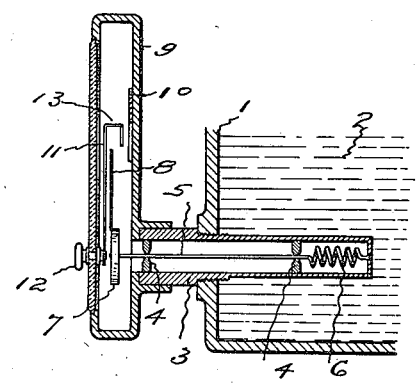
INVENTOR
Henry J. Blakeslee
Harry R. Williams
ATTORNEY.

Patented Feb. 26, 1924.

1,485,013

UNITED STATES PATENT OFFICE.

HENRY J. BLAKESLEE, OF HARTFORD, CONNECTICUT.

MEANS FOR INDICATING LOAD CONDITIONS OF TRANSFORMERS.

Application filed December 29, 1921. Serial No. 525,812.

*To all whom it may concern:*

Be it known that I, HENRY J. BLAKESLEE, a citizen of the United States, residing at Hartford, in the county of Hartford and State of Connecticut, have invented a new and useful Improvement in Means for Indicating Load Conditions of Transformers, of which the following is a specification.

This invention relates to means designed for indicating the degree to which transformers of electrical energy are loaded.

It is desirable to know what the load conditions of a transformer are, as too great a load for a prolonged period will injure the transformer, and if the load is much less than the transformer will safely carry without injury it is not economical and should be replaced by one of smaller capacity. Transformers are limited as to the load they will carry by their operating temperature and the operating temperature is affected by climatic changes.

In oil insulated transformers the difference in temperature between the oil in the transformer case and the air surrounding the transformer case is a factor of the degree to which the transformer is loaded in terms of percent of full load. Therefore the indications of an instrument which shows such temperature difference may be interpreted in terms of load or in terms of percent of full load.

The object of this invention is the provision of a simple instrument which can be easily applied to a transformer in such manner as to be subject to both the interior and exterior temperatures, and the indications of which are the resultant of the opposing effects of the interior and exterior temperatures, or temperature difference, shown in a form readily translatable into terms of load, regardless of climatic changes in temperature.

In the accompanying drawings Figure 1 shows a transformer of common type provided with a device which embodies this invention. Fig. 2 shows on larger scale a section of the transformer and load-indicating device. Fig. 3 shows a face view of the load-indicating device.

The transformer which is illustrated has a casing 1 of common shape and it contains oil 2 as usual. The load-indicator case is shown as a tubular plug 3 and this plug is designed to be screwed into a threaded opening in the wall of the transformer case. The plug may be screwed into the opening commonly provided for drawing oil from the transformer or it may be screwed into any other opening made through the wall of the transformer or the cover thereof, in such manner that a portion of the instrument casing will be immersed in the oil in the interior and a portion will be exposed to the atmosphere about the exterior.

Supported by bearings 4 in the instrument casing is a spindle 5. Fastened between the inner end of the spindle and the instrument casing is a thermo-responsive strip 6, that is, a strip composed of two metals having different temperature co-efficients of expansion. A similar thermo-responsive strip 7 may be attached to the outer end of the spindle. These strips may be wound in any suitable shape, for instance one may be in the form of a helix and the other in the form of a spiral, as shown, or both may be spiral or both helical, as is most convenient. A pointer 8 is attached to the free end of the outer thermal strip. These two thermal strips are so proportioned and arranged that for a given change in temperature of both the angular rotation imparted to the spindle will be equal but opposite to the angular displacement imparted to the pointer. In the outer section 9 of the instrument casing, that may be integral with or attached to the plug, is a scale 10 so graduated and marked that the position of the pointer may be readily noted. Mounted to turn freely in the outer section of the instrument casing is an index finger 11 that is adapted to be set by a button 12. The upper end 13 of the index is shaped so as to be engaged and moved by the pointer when the latter travels across the scale in one direction.

When the transformer is not in operation the oil in the interior and the air on the exterior will be at substantially the same degree and therefore with climatic changes in temperature the rotation given to the spindle by changes in the form of the inner thermo-responsive strip will be compensated by opposite changes in form of the outer thermo-responsive strip which will cause the pointer to remain substantially stationary at a position which would preferably be zero of the scale.

If a load is put on the transformer the temperature of the oil rises and the distortion of the inner coil will become greater than the opposite distortion of the outer coil, whatever may be the climatic temperature, therefore under conditions of load the pointer will take a position other than that which it takes when there is no load on the transformer. The position of the pointer on the scale will thus be a function of the load on the transformer and consequently the scale indications of the instrument may be interpreted in terms of the transformer load or in terms of the percentage of full rated load of the transformer.

The index finger is moved by the pressure of pointer in the direction away from the zero of the scale and will remain in such position until reset manually. The position of the index therefore becomes an indication of the maximum load to which the transformer has been subjected during the time elapsing since its previous resetting. The instrument does not indicate momentary load fluctuations but rather sustained load values as the temperature of the oil changes more gradually than the temperature of the transformer winding. The indications are therefore of loads sustained over periods which are of value in determining the adequacy of transformer size for economical operating conditions.

The invention claimed is:

1. The combination with a transformer of a device for indicating the load conditions of the transformer, which device comprises a casing inserted in the walls of the transformer casing and containing inside the transformer casing thermal means responsive to temperature changes and containing outside the transformer casing thermal means responsive to temperature changes, said thermal means being designed to act oppositely to each other, and indicating means responsive to the resultant of the opposing actions of said thermal means.

2. The combination with a transformer of a device for indicating the load conditions of the transformer, which device comprises a casing inserted in the wall of the transformer casing and enclosing thermo-responsive means subject to the temperature within the transformer casing, thermo-responsive means subject to the temperature without the transformer casing, said inner and outer thermo-responsive means being arranged to expand and contract oppositely, and indicating means connected with, and positioned by the resultant of the opposing actions of, said thermo-responsive means.

3. The combination with a transformer of a device for indicating the load conditions of the transformer which device comprises a casing inserted in the wall of the transformer casing and enclosing two thermo-responsive spiral coils, arranged one within and one without the transformer casing, to expand and contract oppositely to each other under temperature changes, and a pointer connected with the coils and adapted to be positioned by the resultant of the opposing actions of the two coils.

4. A device for indicating the load conditions of a transformer which device comprises a casing adapted to be inserted in the wall of the transformer casing and enclosing a spindle, a thermo-responsive coil connected between the instrument casing and the spindle and adapted to be located within the transformer casing, a thermo-responsive coil connected to the spindle and adapted to be located without the transformer casing, said coils being arranged to expand and contract oppositely, a pointer connected with the latter coil, and a scale over which the pointer travels.

5. A device for indicating the load conditions of a transformer which device comprises a casing adapted to be inserted in the wall of the transformer casing and enclosing a spindle, two thermo-responsive coils connected to the spindle one within and one without the transformer casing when the instrument casing is in position of use, said coils being arranged and supported so as to expand and contract oppositely, a pointer connected with one coil, a scale over which the pointer travels, an index adapted to be engaged and moved upwardly across the scale by the pointer, and means for manually setting said index.

6. A device for indicating the load conditions of a transformer which device comprises a casing adapted to be inserted in the wall of the transformer casing and enclosing a spindle, a thermo-responsive coil connected between the instrument casing and the inner end of the spindle, a thermo-responsive coil connected to the outer end of the spindle, said coils being arranged to expand and contract oppositely, a pointer connected with the latter coil, a scale over which the pointer travels, an index adapted to be engaged and moved upwardly across the scale by the pointer, and means for manually setting said index.

7. A device for indicating the differences between the temperature within a transformer and the temperature without the transformer regardless of climatic temperature changes, which device has a coil adapted to be located within the transformer and be responsive to the interior temperature, a coil adapted to be located without the transformer and be responsive to the exterior temperature, said coils being arranged to expand and contract oppositely under temperature changes, means connecting said coils and means for indicating the resultant of the opposing actions of said coils.

HENRY J. BLAKESLEE.